United States Patent [19]
Jack et al.

[11] 4,191,719
[45] Mar. 4, 1980

[54] PROCESS FOR PRODUCING MULTICELLULAR ARTICLES FROM A BLEND OF A CRYSTALLINE POLYOLEFIN AND A METAL RESINATE

[75] Inventors: James Jack, Mistley; Godfrey A. King, Manningtree, both of England

[73] Assignee: Bakelite Xylonite Limited, London, England

[21] Appl. No.: 706,594

[22] Filed: Jul. 19, 1976

Related U.S. Application Data

[62] Division of Ser. No. 454,763, Mar. 25, 1974, abandoned.

[51] Int. Cl.$^2$ ............................................. B29D 27/00
[52] U.S. Cl. ................................. 264/41; 260/27 R; 264/211; 264/288.8; 264/21.6; 521/93
[58] Field of Search ................... 264/DIG. 13, 210 R, 264/288, 289, 211; 260/27 R; 521/93

[56] References Cited

U.S. PATENT DOCUMENTS

| 2,837,491 | 6/1958 | McKay ............................... 260/27 R |
| 3,313,754 | 4/1967 | Logan ........................... 264/210 R X |
| 3,335,104 | 8/1967 | Kopacki et al. ............... 260/27 R X |
| 3,365,406 | 1/1968 | Kopacki et al. ............... 260/27 R X |
| 3,463,752 | 8/1969 | Bornstein ........................... 260/27 R |
| 3,663,488 | 5/1972 | Kail ............................... 260/27 R X |
| 3,765,999 | 10/1973 | Toyoda ....................... 264/DIG. 13 |
| 3,775,521 | 11/1973 | Yamamoto et al. ......... 264/210 R X |
| 3,903,234 | 9/1975 | Ikeda et al. ..................... 264/210 R |
| 4,067,938 | 1/1978 | Jack ....................................... 264/41 |

OTHER PUBLICATIONS

"Encyclopedia of Chemical Technology," Edited by Raymond E. Kirk and Donald F. Othmer, vol. II, New York, Interscience, © 1953, pp. 800-802.

Primary Examiner—Philip Anderson
Attorney, Agent, or Firm—Brisebois & Kruger

[57] ABSTRACT

A method for the production of a stretched multi-cellular polyolefin article. A composition comprising a blend of a crystalline polyolefin and about 2–50% by weight of a metal resinate is formed into a shaped article. The shaped article is either uniaxially or biaxially stretched at a temperature between the glass transition temperature and the crystalline melting point of the polyolefin resin to form a multi-cellular article.

11 Claims, No Drawings

PROCESS FOR PRODUCING MULTICELLULAR ARTICLES FROM A BLEND OF A CRYSTALLINE POLYOLEFIN AND A METAL RESINATE

This is a division of application Ser. No. 454,763, filed Mar. 25, 1974 now abandoned.

This invention relates to a novel process for the production of multi-cellular articles from polymer compositions.

The invention provides a polymer composition comprising a blend of a crystalline polyolefin and from more than 2 to 50% by weight calculated on the blend of at least one metal resinate, shapes the blend and stretches the shaped blend to form a multi-cellular article.

This invention also provides a process for the production of a stretched shaped article which comprises making a shaped article from a composition comprising a blend of a crystalline polyolefin and a metal resinate which is present in an amount of from more than 2% to 50% by weight of the total weight of said blend and then uniaxially or biaxially stretching said article at a temperature which is between the crystalline melting point and the glass-transition point of the polyolefin.

The crystalline polyolefin may be, for example, polyethylene, an ethylene copolymer, polypropylene or a propylene copolymer, or it may be a mixture of these. The preferred copolymers are those which have not less than 80% of their weight constituted by the principal olefin component.

The glass-transition point (or, as it is also known, the "glass-transition temperature") of a polyolefin used in this invention can be measured by various well-known means. In cases where the polymer exhibits multiple transitions, the temperature selected for the purposes of definition in the present invention should be that which has been described as Tg (U) by R. F. Boyer ("Plastics & Polymers", February, 1973, p 15). Glass-transition points are found to be of the order of $-30°$ C. and $-10°$ C. for, respectively, commercially available polyethylene and polypropylene.

The crystalline melting point of a polyolefin used in the present invention is herein defined as that temperature above which crystalline regions cannot be recognised; for example, the temperature when spherulites disappear when a sample of the polyolefin is heated while being examined by means of a polarising microscope. Melting points of commercially available polyolefins are found to be of the order of $110°$ C., $135°$ C., and $175°$ C. and $237°$ C. for, respectively, branched polyethylene, linear polyethylene, isotactic polypropylene and poly-4-methyl Pentene-1.

Metal resinates have been described in the "Encyclopeadia of Chemical Technology", edited by R. E. Kirk and D. F. Othmer, Vol. 11, 800–802 (1953). A metal resinate used in this invention may, for example, be a calcium or zinc resinate; a mixture of metal resinates; or a mixed metal resinate, for example, zinc/calcium resinate. Preferably, it will have physical properties such that there is a suitable melt-compounding temperature at which both it and the crystalline polyolefin are molten. The metal resinate is present in the blend in an amount of from 2% to 50%, preferably 5% to 25%, of the total weight of the blend. The softening point is measured by means of a ring-and-ball apparatus as described in Test E28-67 of the American Society for Testing Materials. Commercially available grades of metal resinates are specified as having "softening-ranges". Such a range indicates that a metal resinate will have a softening point which falls within the softening range quoted by the manufacturers for its particular grade.

Certain metal resinates may not be suitable as additives for use with certain polymers in the process of this invention to produce multicellular stretched articles and even for a given additive the suitability may vary from batch to batch.

The suitability of a metal resinate for use in the compositions of the invention for this purpose may be determined by the following test.

Test Procedure (1) Test compositions are prepared as follows:

(a) 15 Parts by weight of the metal resinate are uniformly and finely dispersed in 85 parts by weight of the thermoplastics material by blending under fluxing conditions for the thermoplastics material (b) 15 Parts by weight of the rosin-ester-or metal resinate and 5 parts by weight of an uncoated calcium carbonate filler for mean particle size $2.5\mu$ are uniformly and finely dispersed in 80 parts by weight of the thermoplastics material by blending under fluxing conditions for the thermoplastics material.

(c) 5 Parts by weight of the uncoated calcium carbonate filler used in (b) are uniformly and finely dispersed in 95 parts by weight of the thermoplastics material by blending under fluxing conditions for the thermoplastics material.

(2) Test specimens are then produced from compositions (a), (b) and (c) and also from (d) the thermoplastics material without additives by shaping the compositions under heat and pressure into samples free from significant flaws and free from significant molecular orientation of the thermoplastics material and having a uniform thickness. From each sample is cut a specimen suitable for uniaxial stretching on an Instron tensile testing machine or similar machine.

(3) Test specimens, which have a shape such that the major part of the elongation during stretching occurs in a region initially of uniform cross-section, are then individually stretched uniaxially in the Instron tensile testing machine at various temperatures lying in the range in which the thermoplastics material can be oriented by stretching the maximum test temperature being the softening point of the metal resinate at a uniform gripper separation rate of 4 to 10 inches/min, the initial gripper separation being one to two inches. The test specimen is stretched to just before break (determined by stretching one test specimen to break and stretching a second to 90% of the elongation at break of the first) and so that the gripper separation is increased by at least 100%, the specimen remaining securely gripped. The stretched test specimens are then cooled, if necessary, to room temperature and released.

(4) Samples are cut from the narrowest portion of each stretched test specimen and the density of each sample is determined. The densities of each of stretched samples (a), (b), (c) and (d) are compared with the density of the relevant unstretched test specimen and the percentage density reduction is calculated.

For metal resinates suitable for use in compositions of the present invention without fillers the difference between the percentage density reduction achieved with a Specimen (a) and the percentage density reduction achieved with the corresponding specimen (d) is greater than or equal to 3.

For metal resinates suitable for use in the compositions of the invention with fillers the difference between the percentage density reduction achieved with a specimen (b) and the percentage density reduction achieved with the corresponding specimen (c) is greater than or equal to 3.

In addition to establishing those additives that are suitable for use in the process of the invention to produce multicellular stretched articles the test also provides a guide to the temperature conditions under which multicellular articles can be produced from a given composition by uniaxial stretching.

The blend may be prepared by any method, or combination of methods, which is suitable for compounding thermoplastics formulations based on a crystalline polyolefin. The ingredients may, for example, be processed successively by powder mixer, banbury mixer, sheeting mill and calender to provide sheet as a shaped article. Another method involves mixing the ingredients of the blend in a compounding extruder which provides an extrudate which may be in the form of pellets which can be fed to equipment for providing a shaped article in the form of, for example, sheet, tubing, bottles, filaments, or injection mouldings.

The stretching of a shaped article in the process of the present invention may be achieved by any method suitable for uniaxially or biaxially stretching a thermoplastic crystalline polyolefin. Examples of such methods are:

longitudinal or transverse uniaxial stretching of sheet or strip; simultaneous or sequential biaxial stretching of sheet; "bubble-blowing" of tubes; longitudinal stretching of filaments; blowing of bottles and other hollow articles; vacuum—or pressure—forming of sheet. The degree of stretching employed in the process of the invention is to some extent dependent upon the formulation used to make the shaped article and upon heat-history to which that article is subjected during the time which elapses between its formation and the start of its being stretched. It is, for example sometimes advantageous to provide a "heat-seasoning" or "annealing" stage prior to the entry of the shaped article into the stretching stage of the process. The degree of stretching is also dependent on the physical properties desired in the stretched shaped article. We have found that the stretched shaped articles of this invention can be produced satisfactorily when employed stretch-ratios of for example up to 12:1 for uniaxial stretching, or stretch-ratios of up to 9:1 in each direction for biaxial stretching of shaped articles made from blends based on polyethylene. The corresponding figures for compositions based on isotactic polypropylene were found to be 10:1 (uniaxial) and 7:1 (biaxial).

The unstretched shaped articles made from the compositions of this invention do not normally exhibit any cellular structure. When certain compositions have been stretched in the process of this invention they exhibit a multicellular structure. Such a structure is only produced when the article is being stretched at a temperature which lies below the softening point of the metal resinate. Thus, we have found that, with a metal resinate having a softening point in the range of 185° C. to 195° C., a cellular structure was observed when sheet made by a "blown-bubble" process from an 85/15 polypropylene/resinate blend was stretched biaxially at temperatures ranging from 130° C. to 165° C. and when strips cut from sheet made from the same blend were stretched uniaxially at temperatures ranging from 20° C. to 165° C.

Additives, such as those mentioned later in this specification, may effect a lowering of the softening point of a metal resinate to a temperature below that measured on the resinate itself by the apparatus and procedure of ASTM-E28-67. This lowering cannot be predicted with any certainty and we prefer to conduct the stretching stage of the process of this invention at a temperature at least 10° C. lower than the lower limit of the quoted softening range.

The nature of a multicellular article provided by the process of the present invention causes it to have a density which is smaller than that of the shaped article from which it is produced. We can relate the increase of volume of an article with its change of density, assuming that the weight of any gas (most probably air) in the cells can be ignored, by:

$$\% \text{ increase of volume} = 100((D_1/D_2) - 1)$$

wherein
$D_1$ = density of unstretched article
$D_2$ = density of stretched article We can express the volume of the cells existing in a multicellular article as a percentage of the overall volume of that article as $$\% \text{ cellular volume} = 100(1 - (D_2/D_1))$$

Thus, a $33\frac{1}{3}$ reduction of density gives a 50% increase of volume; the resulting multicellular article will have $33\frac{1}{3}$ of its volume existing as voids. Examples given later illustrate the density and volume changes which can be achieved by the process of the present invention.

The structure of multicellular stretched articles made from unfilled, unpigmented blends of this invention leads to a degree of opacity of the articles because of scattering of light by the cells. We have found that the first visually detectable degree of opacity can occur when the metal resinate constitutes about 2% of the weight of the blend in which it is incorporated.

It is envisaged that other processes may also be conducted on the stretched articles produced from the compositions of the invention. Possible treatments include the use of corona-discharge, chemical oxidation, UV-irradiation, solvents and swelling agents and the applications of surface coatings.

Additives such as lubricants, antistatic agents, antioxidants, stabilisers, dyes or pigments, fillers (both organic and inorganic), blowing agents and minor quantities of incompatible polymers can be incorporated in the compositions of the invention. Fillers and/or pigments are advantageously added in an amount up to 30% by weight calculated on the total weight of the composition and advantageously have a particle size of from 1 to 10μ, preferably 2 to 8μ. Unstretched articles made from blends to which blowing agents have been added may, in distinction from what has been stated above, be multicellular if the blowing agent has been activated. The stretching stage of the process of this invention in which suitable metal resinates are employed will increase the volume of voids and so, as with other blends of the invention employing suitable metal resinates, will also cause a lowering of density.

The multicellular products of this invention may be used for all applications where articles having a lowered density and a degree of opacity are useful. Thus, we have found that multicellular unpigmented and unfilled sheet made by the process of the invention from blends containing 15% of a metal resinate and based either on linear polyethylene (also known as "high density polyethylene") or on isotactic polypropylene has a paper-like "feed", and after suitable corona discharge treatment, can be printed excellently by conventional printing methods. These prints adhere well to the sheet. Such material is thus suitable for use as synthetic paper. Sheet made by the process of the invention may be heat-sealed to form bags or wrappers. Multicellular filaments made by the process of the invention may be used directly as produced or they may be subjected to further treatment to be broken down to fibril-form e.g. by severe mechanical treatment which may be coupled with subjection to solvents or heat. These fibrils may then be used in processes employed by the textile and paper industries.

The following examples are given to illustrate the present invention, but are not to be construed as limiting the scope thereof:

EXAMPLE 1

8.5 Kg of polypropylene (ICI Grade PXC 3391), of glass-transition point 0° C. and crystalline melting point 170° C., was dry tumbled with 1.5 Kg. of Ennesin ZC 21 (from Leon Frenkel Ltd.), a zinc/calcium resinate whose softening range was 185° C.–195° C. (ring-and-ball) and whose metal content was 8.0%. The blend was extrusion-compounded at a temperature of 210° C. to give pellets which were then re-extruded as a tube through a die held at 210° C., at a rate of 200 g/min into a water bath held at 20° C. The tube had an internal diameter of 41 mm and a wall having a thickness of 0.7 mm and a density of 0.93 g/ml. This figure for the density represents the average for at least three speciment, of the results obtained by a flotation test using a range of liquids of known densities. The density figures given in the other Examples of this specification were determined by the same method. The tube was taken continuously from the water bath and stretched in a blown-bubble process at a temperature of 130° C., measured by means of a radiation pyrometer, using stretch-ratios of 6:1 in the machine and transverse directions at a rate-of-stretch (surface area) of 128,000% per minute. Tubular film was produced in layflat form at a width of 340 mm. This film was substantially opaque and had a multicellular structure in which the cells were predominantly of the closed type. After surface treatment by corona discharge, this film was found to print excellently when passed through an offset lithographic press.

Properties of this film were as follows:
Tensile strength: Machine direction: 880 kg/cm$^2$
Tensile strength: transverse direction: 710 kg/cm$^2$
% Elongation at break: machine direction: 48
% Elongation at break: transverse direction: 47
Density, g/ml: 0.62
% Density reduction (arising from stretching): 33
% Increase of volume (arising from stretching): 50

EXAMPLE 2

High-density polyethylene of density 0.95 gm/cc (B.P. Chemicals Ltd. "Rigidex 2000), of glass-transition point −30° C. and crystalline melting point 135° C., was dry tumbled with 15% by weight of Ennesin ZC 14 (from Leon Frenkel Ltd.), a zinc/calcium resinate whose softening range was 170°–180° C. and metal content was 8.0%. The blend was extrusion compounded at a melt temperature of 210° C. The extrudate was pelleted, then re-extruded through a die held at 210° C. as sheet on to metal rollers at 70° C. The sheet had a width of 370 mm, a thickness of one millimetre and a density of 0.96 g/ml. The sheet was reheated and then simultaneously biaxially stretched on a flat-bed stretcher at a temperature of about 120° C. with a machine stretch-ratio of 4:1 in each direction and a rate of stretch (surface area) of 5,350% per minute. Flat, substantially opaque sheet was produced of width 1470 mm and thickness 63 microns. It had a multicellular structure in which the cells were predominantly of the closed type. After surface treatment by corona discharge, this sheet was found to print excellently when passed through an offset lithographic press.

Properties of the sheet were as follows:
Tensile strength: machine direction: 650 kg/cm$^2$
Tensile strength: Transverse direction: 530 kg/cm$^2$
% Elongation at break: machine direction: 46
% Elongation at break: transverse direction: 57
Density, g/ml: 0.62
% Density reduction (arising from stretching): 35
% Increase of volume (arising from stretching): 55

EXAMPLE 3

A number of experiments were conducted on the lines of Example 1, but with the 15% content of Ennesin ZC 21 being replaced by various percentage contents of Ennesin ZC 14. Measurements of densities of the resultant films are given in the following table.

| Polypropylene: ZC 14 weight ratio | Density g/ml |
| --- | --- |
| 100 : 0 | 0.91 |
| 99 : 1 | 0.91 |
| 97 : 3 | 0.85 |
| 96 : 4 | 0.83 |
| 95 : 5 | 0.80 |
| 90 : 10 | 0.69 |
| 88 : 12 | 0.66 |
| 85 : 15 | 0.62 |
| 82 : 18 | 0.65 |
| 80 : 20 | 0.68 |

The table shows that under the conditions of experiment the density of the films falls with increase of the percentage of the zinc/calcium resinate in the blend and then rises again with the lowest density being at a 15% content of ZC 14. A plot of these points gives a density of 0.88 g/ml at a 2% content of the metal resinate i.e. a reduction of about 3.3% below that of the material containing no metal resinate.

EXAMPLE 4

A composition (designated A) was prepared substantially as in Example 2 but having the following composition:

| | Parts by weight |
| --- | --- |
| Rigidex 2000 | 81 |
| Ennesin ZC 21 | 15 |
| Titanium Dioxide RCR2+ | 4 |

+supplied by Tioxide International Ltd.

The composition was divided into two parts which were extruded and stretched on a flat-bed stretcher substantially as described in Example 2 under conditions listed in the table below.

For purposes of additional comparison, a sample of Rigidex 2000 (designated B), to which no resinate or RCR2 had been added, was also extruded and stretched under the conditions described in the table below:

| Experiment No. | 1 | 2 | 3 |
| --- | --- | --- | --- |
| Sample Code | A1 | A2 | B |
| Die Temperatures ° C. | 220 | 220 | 220 |
| Roll Temperatures ° C. | 95 | 95 | 95 |
| Stretching Temperatures ° C. | 138 | 128 | 128 |
| Sheet thickness (ingoing) mm | 1.5 | 1.5 | 1.5 |
| Density (ingoing), g/ml | 1.0 | 1.0 | 0.95 |
| Sheet thickness (outgoing), microns | 74 | 100 | 75 |
| Density (outgoing), g/ml | 1.0 | 0.74 | 0.95 |
| % density reduction | 0 | 26 | 0 |
| % increase of volume | 0 | 35 | 0 |

Sample A2 showed considerably greater opacity than samples A1 and B and had a multicellular structure. Multicellular structure was not observed in either B, which contained no metal resinate, or in A1 which had been stretched at a temperature above the crystalline melting point of Rigidex 2000.

After surface treating by corona discharge, the sheets were passed through an offset lithographic press and printed using an ink formulated to dry by oxidation. After 10 minutes, an inked area of each sheet was rubbed lightly with the forefinger, giving rise to the following effects:

|  | A1 | A2 | B |
| --- | --- | --- | --- |
| Light Rubbing | Ink smeared | Ink did not smear | Ink smeared |
| Strong Rubbing | Ink smeared | Ink partially removed | Ink removed |

In sample A2, the ink had penetrated into micropores in the surface and this effectively increased the rate of drying of the ink.

EXAMPLE 5

Experiment A

High density polyethylene (Rigidex 2000) was dry tumbled with 15% by weight of Ennesin ZC 14. The blend was extrusion compounded at a die temperature of 210° C. The extrudate was pelleted, then re-extruded as a tube into a water bath held at 20° C. The rate of extrusion was 200 g/min. The tube had an internal diameter of 40 mm and a wall having a thickness of 0.7 mm and a density of 0.96 g/ml. The tube was taken continuously from the water bath and stretched in a blown-bubble process at a temperature of 115° C., using stretch-ratios of 5:1 in the machine and transverse directions at a rate of stretch (surface area) of 89,000% min. Tubular film of 200 mm diameter was produced. Properties of the film were as follows:

Tensile strength: machine direction: 710 kg/cm$^2$
Tensile strength: transverse direction: 780 kg/cm$^2$
% Elongation at break: machine direction: 51
% Elongation at break: transverse direction: 44
Density, g/ml: 0.61
% Density reduction (arising from stretching): 36
% Increase of volume (arising from stretching): 57

Experiment B

As a comparison, a "blown-bubble" process was run on the lines of Experiment A, but with the difference that Rigidex 2000 was used on its own, i.e. without additions of metal resinate or other materials. Tube extrusion was as in Experiment A and the same apparatus for bubble-blowing was used. The temperature at which this blowing was conducted was 118° C. It was found impossible to maintain an unbroken bubble when applying stretch-ratios of 5:1 in the machine and transverse directions. However, the bubble could be maintained when applying a stretch-ratio of 5:1 in the machine direction and a stretch-ratio of from 3:1 to 4:1 in the transverse direction. Typical values of tensile strength of film made from Rigidex 2000 using these unbalanced stretch-ratios were:

Tensile strength: machine direction: 1050 kg/cm$^2$
Tensile strength: transverse direction: 630 kg/cm$^2$ Similar running difficulties were experienced when other commercially available high-density polyethylenes replaced the Rigidex 2000.

Experiments A and B illustrate the greater ease of obtaining "balanced" stretched film when a blend of high-density polyethylene and calcium/zinc resinate replaces high-density polyethylene in a blown-bubble process.

EXAMPLE 6

Example 1 was repeated except that the mixed metal resinate was replaced in turn by (a) Ennesin PC 175 (supplied by Leon Frenkel) and described as dimerised calcium resinate of softening range 175°–180° C.

(b) A zinc resinate, (supplied by Leon Frenkel), having a softening range of 140° C.–150° C.

The blowing temperature, measured by radiation pyrometer, was 135° C. The densities of the unblown and stretched tubes were determined for each of the additives and the density reductions calculated respectively were- (a) 39%
(b) 18%

Both of the stretched products were substantially opaque and had a multicellular structure in which the cells were predominantly of the closed cell type.

EXAMPLE 7

A composition of the following formulation was prepared.

|  | Parts by Weight |
| --- | --- |
| Polypropylene (P X C 3391) | 65 |
| Polyethylene (Rigidex 2000) | 17.5 |
| Ennesin ZC 14 | 15 |
| Polystyrene (ST 30 UL - Sterling Moulding Materials Ltd) | 2.5 |

The procedure of Example 1 was followed but substituting the above formulation for the composition used in Example 1.

The stretched tubular film produced had a density of only 0.5 gm/cc, which was about 45% lower than that of the extruded quenched tube prior to blowing.

EXAMPLE 8

Sheet extruder feed-stocks were prepared respectively from the following formulations: (all parts being by weight)

| Component | | Formulation) | | | | | | | | |
|---|---|---|---|---|---|---|---|---|---|---|
| | | 1 | 2 | 3 | 4 | 5 | 6 | 7 | 8 | 9 |
| "a" | Rigidex 2000 | 70 | 85 | 80 | 74 | 76.6 | 65 | 65 | 81.5 | 81.5 |
| "b" | Ennesin ZC 21 | — | 15 | 8 | 8 | 9.6 | 10 | 10 | 13.5 | 13.5 |
| "c" | Ca Co$_3$ (Calopake F) (Average particle size 2.5 μ) | 30 | — | 8 | 12 | 9.2 | 20 | — | 5 | — |
| | Ti O$_2$ Rutile (Particle size 1 to 5 μ) | — | — | 4 | 6 | 4.6 | 5 | 5 | — | 5 |
| | Diatomaceous earth (Celite PF1 supplied by Johns Manville Corpn.) (Particle size 5 to 15 μ) | — | — | — | — | — | — | 20 | — | — |

The sheet extruder feed-stocks were each prepared in the following manner:

(i) A Master Batch "A" was prepared containing equal proportions of components "a" and "b". To assist the preparation of the Master batch "A" and its extrusion, "b" (the Ennesin ZC 21) was crushed such that it passed through a ¼" mesh sieve.

The crushed "b" component, was then tumble-mixed with an equal weight of "a" and the mix fed to a twin screw extruder and extruded, employing a melt temperature of approximately 205° C. The extrudate comprising a flat strip was air cooled and diced. This product was Master Batch "A"

(ii) A Master Batch "B" was prepared containing equal proportions of components "a" and "c". When components "c" includes more than one sub-component, the sub-components will be present in component "c" in the proportions specified in the above table. Components "a" and "c" in equal proportions were tumble mixed and the mixture fed to a Banbury-type mixer heated to 160° C. and the mixer operated for seven minutes such as to achieve thorough mixing and a material temperature of 200° C.

The Banbury-mixed material was then discharged on to a mill maintained at approximately 155° C. and from which it was removed continuously in the form of a strip which was cooled by passage through a water bath, dried by festooning in air and diced.

(iii) Master Batch "A" and/or Master Batch "B" as applied to the above formulations were tumble mixed with a further amount of component "a" to give the required total formulation as specified in the above table and the required sheet extruder feed stock.

The sheet extruder feed-stocks, comprising respectively formulations 1 to 9 above were further dried and then fed to a sheet extruder fitted with a sheet die held at a temperature of 210° C. and extruded as a sheet on to metal rollers at 95° C. The sheet had a width of 370 mm and a thickness of 1 mm. The sheet fed at a rate of 7.5 feet/min was reheated and then simultaneously biaxially stretched on a flat-bed stretcher, of the type described in our co-pending British application 35302/70, at a stretching temperature as indicated respectively in the following table, and employing a machine stretch-ratio of 4:1 in each direction to achieve a linear output rate of 30 feet/min. The stretched sheet produced from each feedstock was cooled while being held at its edges to prevent substantial shrinkage, edge-trimmed and reeled. Samples of each material were taken before stretching and after stretching and density determinations made, the results of which are given in the following table:

| | Formulation | | | | | | | | |
|---|---|---|---|---|---|---|---|---|---|
| | 1 | 2 | 3 | 4 | 5 | 6 | 7 | 8 | 9 |
| Approximate Stretching Temperature °C. | 125 | 120 | 120 | 120 | 120 | 120 | 120 | 120 | 120 |
| Density Reduction % on Stretching | 0 | 23 | 5 | 15 | 20 | 50 | 30 | 35 | 20 |

Stretching of the sheet produced from formulation 1 was difficult and could not be achieved below 125° C. The product exhibited no density reduction and had the appearance of ordinary chalk-filled sheet. Each of the stretched products obtained from formulations 2 to 9 were flat and exhibited enhanced whiteness increasing with the degree of density reduction, arising from the multicellular structure produced on stretching, which multicellular structure was comprised predominantly of cells of the closed type. After surface treatment by Corona discharge, the sheets were found to print well when passed through an off-set lithographic press.

We claim:

1. A process for the production of a multicellular stretched article, which comprises forming a blend of a crystalline polyolefin and at least one additive, the additive comprising from more than 2 to about 50% by weight, calculated on the weight of the blend, forming a shaped article from the blend and stretching the article uniaxially or biaxially to produce a multicellular stretched article, wherein the additive is at least one metal resinate which is at least partially incompatible with the polyolefin at least at the temperature at which the article is to be stretched, the blend is formed by blending the polyolefin with the metal resinate at a temperature at which both the metal resinate and the polyolefin are molten or at least soft, and stretching is effected at a temperature within the normal orientation temperature range for the polyolefin, which temperature is below the softening point of the metal resinate.

2. A process as claimed in claim 1, wherein the thermoplastics material is selected from crystalline polyethylene, crystalline polypropylene, crystalline ethylene copolymers and crystalline propylene copolymers.

3. A process as claimed in claim 1, whenever the thermoplastics material is a high density polyethylene having a density of at least 0.94 gm/cc.

4. A process as claimed in claim 1, wherein the metal resinate is selected from calcium and zinc resinates, mixtures of calcium and zinc resinates and mixed calcium-zinc resinates.

5. A process as claimed in claim 1, wherein the blend also contains at least one additional additive selected from fillers and pigments.

6. A process as claimed in claim 5, wherein the additional additive is selected from calcium carbonate and titanium dioxide.

7. A process as claimed in claim 1, wherein the article is a fibre, filament, tape, sheet, or film or a tube.

8. A process as claimed in claim 1, wherein stretching is carried out in a flat bed stretching apparatus for simultaneous biaxial stretching.

9. A process for the production of a multi-cellular stretched article which comprises forming an article from a composition comprising a blend of a crystalline polyolefin and from about 2% to about 50% by weight calculated on the blend, of at least one metal resinate, and stretching the article at a temperature between the glass-transition temperature of the polyolefin and the crystalline melting point of the polyolefin and below the softening point of the metal resinate.

10. A process as claimed in claim 9, wherein the article is selected from fibres, filaments, tapes, sheets, films and tubes.

11. A process as claimed in claim 9, wherein stretching is carried out on a flat bed stretching apparatus for simultaneous biaxial stretching.

* * * * *

UNITED STATES PATENT OFFICE
CERTIFICATE OF CORRECTION

PATENT NO. : 4,191,719
DATED : March 4, 1980
INVENTOR(S) : JAMES JACK et al

It is certified that error appears in the above-identified patent and that said Letters Patent are hereby corrected as shown below:

On the title page add the following:
[30]   Foreign Application Priority Data

March 26, 1973 Great Britain ........ 14513/73

*Signed and Sealed this*

*Twentieth* Day of *May 1980*

[SEAL]

Attest:

SIDNEY A. DIAMOND

*Attesting Officer*   *Commissioner of Patents and Trademarks*